(12) United States Patent
Zaus

(10) Patent No.: US 10,009,911 B2
(45) Date of Patent: Jun. 26, 2018

(54) USER EQUIPMENT AND MOBILITY MANAGEMENT ENTITY AND METHODS FOR PERIODIC UPDATE IN CELLULAR NETWORKS

(71) Applicant: Intel IP Corporation, Santa Clara, CA (US)

(72) Inventor: Robert Zaus, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 14/916,843

(22) PCT Filed: Sep. 23, 2014

(86) PCT No.: PCT/US2014/056909
§ 371 (c)(1),
(2) Date: Mar. 4, 2016

(87) PCT Pub. No.: WO2015/065619
PCT Pub. Date: May 7, 2015

(65) Prior Publication Data
US 2016/0255602 A1    Sep. 1, 2016

Related U.S. Application Data

(60) Provisional application No. 61/898,425, filed on Oct. 31, 2013.

(51) Int. Cl.
*H04W 4/00* (2018.01)
*H04W 72/10* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
CPC . H04W 60/00; H04W 88/06; H04W 36/0022; H04W 48/18; H04W 60/04;
(Continued)

(56) References Cited

U.S. PATENT DOCUMENTS 9,118,452 B2   8/2015   Park et al.
9,144,091 B2   9/2015   Yamada et al.
(Continued)

FOREIGN PATENT DOCUMENTS

CN   100411470 C   8/2008
CN   105379148 A   3/2016
(Continued)

OTHER PUBLICATIONS

"International Application Serial No. PCT/US2014/056909, International Search Report dated Dec. 26, 2014", 3 pgs.
(Continued)

*Primary Examiner* — Nimesh Patel
(74) *Attorney, Agent, or Firm* — Schwegman Lundberg & Woessner, P.A.

(57) ABSTRACT

Embodiments of a User Equipment (UE) and methods for operating in a mobile network that supports packet-switched (PS) and circuit-switched (CS) communication are generally described herein. The UE may include hardware processing circuitry to transmit a registration message for registration with the PS node and a CS node of the mobile network and for an establishment of a signaling session between the PS node and the CS node for the UE. The hardware processing circuitry may be further to transmit a periodic registration update message for remaining registered with the PS node. In some embodiments, the periodic registration update message may include a signaling permission indicator for a re-establishment, by the PS node, of the signaling session between the PS node and the CS node for the UE.

19 Claims, 7 Drawing Sheets

(51) Int. Cl.

| | | |
|---|---|---|
| *H04W 24/10* | (2009.01) | |
| *H04W 48/06* | (2009.01) | |
| *H04W 74/00* | (2009.01) | |
| *H04W 72/04* | (2009.01) | |
| *H04W 76/02* | (2009.01) | |
| *H04W 48/08* | (2009.01) | |
| *H04W 48/18* | (2009.01) | |
| *H04W 28/02* | (2009.01) | |
| *H04W 48/12* | (2009.01) | |
| *H04W 36/00* | (2009.01) | |
| *H04W 4/02* | (2018.01) | |
| *H04W 8/00* | (2009.01) | |
| *H04W 52/34* | (2009.01) | |
| *H04W 56/00* | (2009.01) | |
| *H04B 17/318* | (2015.01) | |
| *H04W 74/08* | (2009.01) | |
| *H04W 72/08* | (2009.01) | |
| *H04W 8/06* | (2009.01) | |
| *H04W 8/18* | (2009.01) | |
| *H04W 60/00* | (2009.01) | |
| *H04W 60/02* | (2009.01) | |
| *H04J 3/16* | (2006.01) | |
| *H04W 28/08* | (2009.01) | |
| *H04W 92/20* | (2009.01) | |
| *H04W 84/12* | (2009.01) | |
| *H04W 88/08* | (2009.01) | |
| *H04L 5/00* | (2006.01) | |
| *H04W 88/02* | (2009.01) | |
| *H04W 88/18* | (2009.01) | |
| *H04B 7/0413* | (2017.01) | |
| *H04W 8/04* | (2009.01) | |

(52) U.S. Cl.
CPC ........... *H04L 5/0007* (2013.01); *H04W 4/003* (2013.01); *H04W 4/008* (2013.01); *H04W 4/02* (2013.01); *H04W 4/023* (2013.01); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/18* (2013.01); *H04W 92/20* (2013.01)

(58) Field of Classification Search
CPC ... H04W 76/028; H04W 92/02; H04W 28/12; H04W 36/28; H04W 36/36; H04W 60/005; H04W 60/02; H04W 74/02; H04W 36/0033; H04W 8/12; H04W 8/08; H04W 36/0083; H04W 8/02; H04W 8/04; H04W 8/06; H04W 16/18; H04W 36/14; H04W 64/00; H04W 88/08; H04W 88/16; H04W 4/005; H04W 76/068; H04W 40/246; H04W 80/04; H04W 40/24; H04W 40/248; H04W 36/08; H04W 48/10

See application file for complete search history.

(56) References Cited

U.S. PATENT DOCUMENTS

| | | |
|---|---|---|
| 9,210,675 B2 | 12/2015 | Dinan |
| 9,258,747 B2 | 2/2016 | Sivanesan et al. |
| 9,374,151 B2 | 6/2016 | Xiong et al. |
| 9,554,305 B2 | 1/2017 | Moustafa et al. |
| 9,648,514 B2 | 5/2017 | Blankenship et al. |
| 9,674,852 B2 | 6/2017 | Heo |
| 9,693,338 B2 | 6/2017 | Zhao et al. |
| 9,826,539 B2 | 11/2017 | Chatterjee |
| 2003/0013443 A1 | 1/2003 | Willars et al. |
| 2007/0291733 A1 | 12/2007 | Doran et al. |
| 2008/0080428 A1 | 4/2008 | Jappila et al. |
| 2008/0205379 A1 | 8/2008 | Naqvi |
| 2009/0016249 A1 | 1/2009 | Li et al. |
| 2009/0196277 A1 | 8/2009 | Horn et al. |
| 2009/0270098 A1 | 10/2009 | Gallagher et al. |
| 2010/0208654 A1 | 8/2010 | Sampath et al. |
| 2011/0080825 A1 | 4/2011 | Dimou et al. |
| 2011/0164562 A1 | 7/2011 | Qiu et al. |
| 2011/0280212 A1 | 11/2011 | Lv |
| 2012/0020291 A1 | 1/2012 | Nasielski et al. |
| 2012/0063298 A1 | 3/2012 | Yi et al. |
| 2012/0088498 A1 | 4/2012 | Xiao et al. |
| 2012/0202557 A1 | 8/2012 | Olofsson et al. |
| 2012/0218970 A1 | 8/2012 | Westberg et al. |
| 2012/0236776 A1 | 9/2012 | Zhang et al. |
| 2012/0276897 A1 | 11/2012 | Kwon et al. |
| 2012/0327821 A1 | 12/2012 | Lin et al. |
| 2012/0327894 A1 | 12/2012 | Axmon et al. |
| 2013/0022023 A1 | 1/2013 | Aydin |
| 2013/0023269 A1 | 1/2013 | Wang et al. |
| 2013/0023302 A1 | 1/2013 | Sivanesan et al. |
| 2013/0044690 A1 | 2/2013 | Shaheen |
| 2013/0051507 A1 | 2/2013 | Jantunen et al. |
| 2013/0109301 A1 | 5/2013 | Hakola et al. |
| 2013/0121249 A1 | 5/2013 | Ji et al. |
| 2013/0183963 A1 | 7/2013 | Turtinen et al. |
| 2013/0183974 A1 | 7/2013 | Johansson et al. |
| 2013/0332559 A1 | 12/2013 | Mas et al. |
| 2014/0098761 A1 | 4/2014 | Lee et al. |
| 2014/0148174 A1 | 5/2014 | Teyeb et al. |
| 2014/0219248 A1 | 8/2014 | Reddiboyana et al. |
| 2014/0242963 A1 | 8/2014 | Novlan et al. |
| 2014/0301305 A1 | 10/2014 | Xu et al. |
| 2014/0335869 A1 | 11/2014 | Choi et al. |
| 2015/0043420 A1 | 2/2015 | Xiong et al. |
| 2015/0049707 A1 | 2/2015 | Vajapeyam et al. |
| 2015/0078335 A1 | 3/2015 | Sivanesan et al. |
| 2015/0117183 A1 | 4/2015 | Heo et al. |
| 2015/0195750 A1 | 7/2015 | Sivanesan et al. |
| 2015/0195865 A1 | 7/2015 | Lee et al. |
| 2015/0207672 A1 | 7/2015 | Xu et al. |
| 2015/0223258 A1 | 8/2015 | Jung et al. |
| 2015/0244429 A1 | 8/2015 | Zhang et al. |
| 2015/0263836 A1 | 9/2015 | Kim |
| 2015/0312005 A1 | 10/2015 | Huang et al. |
| 2015/0327162 A1 | 11/2015 | Lee et al. |
| 2015/0373609 A1 | 12/2015 | Kim et al. |
| 2016/0044567 A1 | 2/2016 | Baghel et al. |
| 2016/0205612 A1 | 7/2016 | Seo et al. |
| 2016/0219541 A1 | 7/2016 | Chatterjee et al. |
| 2016/0227580 A1 | 8/2016 | Xiong et al. |
| 2016/0234847 A1 | 8/2016 | Zhang et al. |
| 2016/0242128 A1 | 8/2016 | Loehr et al. |
| 2016/0249259 A1 | 8/2016 | Park et al. |
| 2016/0255615 A1 | 9/2016 | Chatterjee et al. |
| 2016/0255640 A1 | 9/2016 | Zitzmann et al. |

(56) References Cited

U.S. PATENT DOCUMENTS

| | | | |
|---|---|---|---|
| 2016/0295614 | A1 | 10/2016 | Lee et al. |
| 2016/0359548 | A1 | 12/2016 | Xiong et al. |
| 2017/0273095 | A1 | 9/2017 | Heo et al. |

FOREIGN PATENT DOCUMENTS

| | | | |
|---|---|---|---|
| CN | 105556994 A | 5/2016 | |
| CN | 105557051 A | 5/2016 | |
| CN | 105557052 A | 5/2016 | |
| CN | 105594140 A | 5/2016 | |
| CN | 105594266 A | 5/2016 | |
| CN | 105612786 A | 5/2016 | |
| CN | 106411490 A | 2/2017 | |
| EP | 2472950 A1 | 7/2012 | |
| EP | 3031147 A1 | 6/2016 | |
| EP | 3047679 A1 | 7/2016 | |
| EP | 3063883 A1 | 9/2016 | |
| EP | 3063982 A1 | 9/2016 | |
| EP | 3064012 A1 | 9/2016 | |
| HK | 1221826 A | 6/2017 | |
| JP | 2010258715 A | 11/2010 | |
| JP | 2016531533 A | 10/2016 | |
| JP | 6162330 B2 | 7/2017 | |
| KR | 1020090124788 A | 12/2009 | |
| KR | 1020110038571 A | 4/2011 | |
| KR | 1020160039235 A | 4/2016 | |
| WO | WO-2011120853 A1 | 10/2011 | |
| WO | WO-2012150815 A2 | 11/2012 | |
| WO | WO-2012159270 A1 | 11/2012 | |
| WO | WO-2013104413 A1 | 7/2013 | |
| WO | WO-2013108048 A1 | 7/2013 | |
| WO | WO-2015021320 A1 | 2/2015 | |
| WO | WO-2015065619 A1 | 5/2015 | |
| WO | WO-2015065768 A1 | 5/2015 | |
| WO | WO-2015065881 A1 | 5/2015 | |
| WO | WO-2015065947 A1 | 5/2015 | |
| WO | WO-2015066281 A1 | 5/2015 | |
| WO | WO-2015066476 A1 | 5/2015 | |

OTHER PUBLICATIONS

"International Application Serial No. PCT/US2014/056909, Written Opinion dated Dec. 26, 2014", 4 pgs.

"[Draft] LS on KeNB* generation in case of MFBI", R2-131153, 3GPP TSG RAN WG2 Meeting #80 bis, (May 24, 2013), 1 pg.

"3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 11)", 3GPP TS 29.018, V11.6.0, (Mar. 2013), 62 pgs.

"3rd Generation Partnership Project; Technical Specification Group Core Network and Terminals; Mobile radio interface Layer 3 specification; Core network protocols; Stage 3 (Release 11)", 3GPP TS 24.008, V 11.8.0, (Sep. 2013), 677 pgs.

"3rd Generation Partnership Project; Technical Specification Group Core Network and Terminals; Non-Access-Stratum (NAS) protocol for Evolved Packet System (EPS); Stage 3 (Release 11)", 3GPP TS 24.301, V11.8.0, (Sep. 2013), 345 pgs.

"U.S. Appl. No. 13/659,655, Response filed Jul. 14, 2016 to Final Office Action dated May 20, 2016", 17 pgs.

"U.S. Appl. No. 14/279,562, Notice of Allowance dated Sep. 4, 2015", 9 pgs.

"U.S. Appl. No. 14/311,938, Examiner Interview Summary dated Jan. 22, 2016", 3 pgs.

"U.S. Appl. No. 14/311,938, Non Final Office Action dated Nov. 2, 2015", 14 pgs.

"U.S. Appl. No. 14/311,938, Notice of Allowance dated Feb. 29, 2016", 5 pgs.

"U.S. Appl. No. 14/311,938, Response filed Jan. 18, 2016 to Non Final Office Action dated Nov. 2, 2015", 7 pgs.

"U.S. Appl. No. 14/491,639, Non Final Office Action dated Apr. 8, 2016", 16 pgs.

"U.S. Appl. No. 14/491,639, Response filed Aug. 8, 2016 to Non Final Office Action dated Apr. 8, 2016", 9 pgs.

"U.S. Appl. No. 14/659,655, Final Office Action dated May 20, 2016", 10 pgs.

"U.S. Appl. No. 14/659,655, Non Final Office Action dated Jan. 21, 2016", 10 pgs.

"U.S. Appl. No. 14/659,655, Notice of Allowance dated Aug. 3, 2016", 8 pgs.

"U.S. Appl. No. 14/659,655, Preliminary Amendment filed Mar. 18, 2015", 47 pgs.

"U.S. Appl. No. 15/186,832, Preliminary Amendment filed Aug. 17, 2016", 8 pgs.

"U.S. Appl. No. 14/659,655, Response filed Apr. 20, 2016 to Non Final Office Action dated Jan. 21, 2016", 31 pgs.

"Comparison of the UP Alternatives", R2-132338 3GPP TSG-RAN WG2 Meeting #83, Barcelona, Spain, NSN, Nokia Corporation, NTT Docomo, Inc., Samsung, (Aug. 2013), 5 pgs.

"Data split options and considerations on U-plane protocol architecture for dual-connectivity", R2-131054, 3GPP TSG-RAN WG2 Meeting #81bis, Chicago, USA Nokia Siemens Networks, (Apr. 2013), 9 pgs.

"Discussion on Multi-level Prach Coverage Enhancement", R1-140616 3GPP TSG RAN WG1 Meeting #76 NTT Docomo, (Feb. 2014), 1-6.

"Evolved Universal Terrestrial Radio Access (E-UTRA); Multiplexing and channel coding", 3GPP TS 36.212 version 8.8.0 Release 8 LTE, (Jan. 2010), 62 pgs.

"Evolved Universal Terrestrial Radio Access (E-UTRA); Physicalchannels and modulation", 3GPP TS 36.211 version 9.1.0 Release 9 LTE, (Apr. 2010), 87 pgs.

"Evolved Universal Terrestrial Radio Access (E-UTRA); Physical layer procedures", 3GPP TS 36.213 V11.0.0 3rd Generation Partnership Project; Technical Specification Group Radio Access Network;, (Sep. 2012), 143 pgs.

"Evolved Universal Terrestrial Radio Access (E-UTRA); Radio Resource Control (RRC); Protocol specification", 3GPP TS 36,331 version 8.6,0 Release 8 ETSI, (Jul. 2009), 211 pgs.

"Further considerations on MTC coverage enhancement", Motorola Mobility, RI-132467, 3GPP TSG RAN WG1 Meeting #73, Fukuoka, Japan, (May 20-24, 2013), 1-3.

"Further discussion on resource allocation for D2D discovery", R1-134116 3GPP TSG RAN WG1 Meeting #74bis CATT, (Oct. 11, 2013), 1-6.

"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.

"Indian Application Serial No. 201647004844, Voluntary Amendment dated Aug. 3, 2016", W/ English Translation, 14 pgs.

"Inter-corresponding sets of resources for D2D discovery", R1-134365 3GPP TSG RAN WG1 Meeting #74bis HTC, (Oct. 11, 2013), 1-2.

"International Application Serial No. PCT/US2014/050214, International Preliminary Report on Patentability dated Feb. 18, 2016", 7 pgs.

"International Application Serial No. PCT/US2014/050214, International Search Report dated Nov. 19, 2014", 4 pgs.

"International Application Serial No. PCT/US2014/050214, Written Opinion dated Nov. 19, 2014", 5 pgs.

"International Application Serial No. PCT/US2014/056003, International Preliminary Report on Patentability dated Mar. 31, 2016", 7 pgs.

"International Application Serial No. PCT/US2014/056003, International Search Report dated Dec. 16, 2014", 4 pgs.

"International Application Serial No. PCT/US2014/056003, Written Opinion dated Dec. 16, 2014". 5 pgs.

"International Application Serial No. PCT/US2014/056909, International Preliminary Report on Patentability dated May 12, 2016", 6 pgs.

"International Application Serial No. PCT/US2014/061569, International Preliminary Report on Patentability dated May 12, 2016", 8 pgs.

(56) References Cited

OTHER PUBLICATIONS

"International Application Serial No. PCT/US2014/061569, International Search Report dated Jan. 16, 2015", 3 pgs.
"International Application Serial No. PCT/US2014/061569, Written Opinion dated Jan. 16, 2015", 6 pgs.
"International Application Serial No. PCT/US2014/062349, International Preliminary Report on Patentability dated May 12, 2016", 10 pgs.
"International Application Serial No. PCT/US2014/062349, International Search Report dated Jan. 26, 2015", 4 pgs.
"International Application Serial No. PCT/US2014/062349, Written Opinion dated Jan. 26, 2015", 8 pgs.
"International Application Serial No. PCT/US2014/062533, International Preliminary Report on Patentability dated May 12, 2016", 8 pgs.
"International Application Serial No. PCT/US2014/062533, International Search Report dated Jan. 21, 2015", 3 pgs.
"International Application Serial No. PCT/US2014/062533, Written Opinion dated Jan. 21, 2015", 6 pgs.
"International Application Serial No. PCT/US2014/063080, International Preliminary Report on Patentability dated May 12, 2016", 7 pgs.
"International Application Serial No. PCT/US2014/063080, International Search Report dated Feb. 12, 2015", 4 pgs.
"International Application Serial No. PCT/US2014/063080, Written Opinion dated Feb. 12, 2015", 5 pgs.
"International Application Serial No. PCT/US2014/063434, International Preliminary Report on Patentability dated May 12, 2016", 10 pgs.
"International Application Serial No. PCT/US2014/063434, International Search Report dated Feb. 16, 2015", 4 pgs.
"International Application Serial No. PCT/US2014/063434, Written Opinion dated Feb. 16, 2015", 8 pgs.
"LS on signalling of multiple frequency band indicators; prioritization of frequency bands supported", R2-122009, 3GPP TSG RAN WG2 Meeting #78 Ericsson, (May 25, 2012), 1 pg.
"On MFBI and EARFCN extension", GP-130431 3GPP TSG GERAN#58 Renesas Mobile Europe Ltd.,, (May 2013), 1-5 pgs.
"On Resource Allocation and System Operation for D2D Discovery", R1-135119 3GPP TSG RAN WG1 Meeting #75 Intel Corporation, (Nov. 15, 2013), 1-6.
"PBCH Coverage Enhancement", Qualcomm Inc, RI-131397, 3GPP TSG-RAN WG1 Meeting #72bis, Chicago, USA, [Online]. Retrieved from the Internet: <URL: http://www.3gpp.org/ftp/tsg_ran/WGI_RL1/TSGRI_72b/Docs/R1-131397.zip>, (Apr. 15-19, 2013).
"PBCH Coverage Extension for MTC Devices", ITRI, R1-132256. 3GPP TSG RAN WG1 Meeting #73, Fukuoka. Japan, [Online]. Retrieved from the Internet: <URL: http://www.3gpp.org/ftp/tsg_ran/WGI_RL1/TSGRI_73/Does/R1-32256.zip>, (May 20-24, 2013), 1-3.
"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WGI/RLI/TSGRI_72b/Docs/R1-130982.zip>, (Apr. 15-19, 2013), 1-4.
"Physical Random Access Channel Coverage Enhancement", R1-134303 TSG RAN WG1 Meeting #74bis, Guangzhou, China ZTE, (Sep. 28, 2013), 1-16.
"PRACH coverage enhancement for MTC UEs", R1-140278 3GPP TSG RAN WG1 Meeting #76 ZTE, (Feb. 2014), 1-8.
"PRACH resource multiplexing to support low cost MTC and coverage enhancement", R1-140027 3GPP TSG RAN WG1 Meeting #76, (Feb. 2014), 1-6.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.

"U.S. Appl. No. 14/491,639, Final Office Action dated Oct. 31, 2016", 19 pgs.
"U.S. Appl. No. 14/491,639, Notice of Allowance dated Jan. 20, 2017", 6 pgs.
"U.S. Appl. No. 14/491,639, PTO Response to Rule 312 Communication dated May 11, 2017", 2 pgs.
"U.S. Appl. No. 14/491,639, Response filed Jan. 3, 2017 to Final Office Action dated Oct. 31, 2016", 10 pgs.
"U.S. Appl. No. 14/659,655, Corrected Notice of Allowance dated Dec. 15, 2016", 2 pgs.
"U.S. Appl. No. 15/026,174, Non Final Office Action dated May 19, 2017", 15 pgs.
"U.S. Appl. No. 15/026,788, Non Final Office Action dated Apr. 11, 2017", 21 pgs.
"Beacon Channel Design for D2D,", Ericsson, 3GPP TSG-RAN WG1#74b R1-134723, 3GPP, (Sep. 27, 2013), 9 pgs.
"Chinese Application Serial No. 2016-544365, Office Action dated Mar. 14, 2017", w. English Translation, 10 pgs.
"Coverage enhancement of PRACH for low cost MTC", Intel Corporation: 3GPP Draft; RI-135104 Intel MTC PRACH, 3rd Generation Partnership Project (3GPP), Mobile Competence Centre ; 650, Route Des Lucioles ; F-06921 Sophia-Antipolis Cedex ; France, (Nov. 2, 2013), 8 pgs.
"Coverage Improvement for PRACH", Intel Corporation: 3GPP Draft; RI-140115—Intel MTC PRACH 3rd Generation Partnership Project (3GPP), Mobile Competence Centre ; 650, Route Des Lucioles ; F-06921 Sophia-Antipolis Cedex ; France, [Online] Retrieved from the Internet : <http://www.3gpp.org/ftp/tsg ran/WGIRLI/TSGRI_76/Docs/>, (Feb. 1, 2014), 9 pgs.
"D2D synchronization—with network coverage", 3GPP TSG-RAN, WG1 Meeting #74bis, R1-134537, (Oct. 11, 2013), 4 pgs.
"Discovery Mode and Data Flow for D2D Discovery", CATT, 3GPP TSG-RAN WG2#83bis R2-133217, 3GPP, (Sep. 27, 2013), 5 pgs.
"Discussion on PRACH Coverage Enhancement for Low Cost MTC", Intel Corporation: 3GPP Draft; R1-132930—Discussion on PRACH Coverage Enhancement for Low Cost MTC, 3rd Generation Partnership Project (3GPP), Mobile Competence Centre ; 650, Route Deslucioles ; F-06921 Sophia-Antipo vol. RAN WG1, no. Barcelona, Spain, (Aug. 10, 2013), 7 pgs.
"Discussion on Resource Allocation for D2D Discovery", ZTE, 3GPP TSG-RAN WG1#74b R1-134309, 3GPP, (Sep. 28, 2013), 11 pgs.
"European Application Serial No. 14834710.7, Extended European Search Report dated Mar. 22, 2017", 9 pgs.
"European Application Serial No. 14856919.7, Extended European Search Report dated May 17, 2017", 8 pgs.
"European Application Serial No. 14858430.3, Extended European Search Report dated Mar. 7, 2017", 9 pgs.
"European Application Serial No. 14858666.2, Extended European Search Report dated Mar. 7, 2017", 8 pgs.
"European Application Serial No. 14858860.1, Extended European Search Report dated Mar. 28, 2017", 9 pgs.
"European Application Serial No. 14859145.6, Extended European Search Report dated Mar. 22, 2017", 8 pgs.
"HiSilicon", Huawei,D2D discovery message size, 3GPP TSG-RAN WG1#74b R1-134075, 3GPP, (Sep. 28, 2013), 4 pgs.
"Japanese Application Serial No. 2016-516873, Office Action dated Feb. 7, 2017", (W/ English Translation), 10 pgs.
"LS on KeNB* generation in case of MFB", TSG RAN WG2: 3GPP Draft; R2-132224 (Reply LS on KENB and MFBI), 3rd Generation Partnership Project (3GPP), Mobile Competence Centre ; 650, Route Des Lucioles ; F-06921 Sophia-Antipolis Cedex ; France, vol. RAN WG2, no. Fukuoka, Japan, (May 23, 2013), 2 pgs.
"On D2D Discovery Transmission Timing", Intel Corporation, 3GPP Draft; R1135121—Intel—Discovery Transmission Timing, 3rd Generation Partnership Project (3GPP), Mobile Competence Centre ; 650, Route Des Lucioles ; F-06921 Sophia-Antipolis Cedex ; France,, [Online] retrieved from the internet: <:http://www.3gpp.org/ftp/tsg_ran/WG1_RL1/TSGR1_75/Docs/>, 7 pgs.
"On MFBI and EARFCN extension", Renesas Mobile Europe Ltd: 3GPP Draft; GP-130569, 3rd Generation Partnership Project (3GPP), Mobile Competence Centre ; 650, Route Deslucioles ;

(56) References Cited

OTHER PUBLICATIONS

F-06921 Sophia-Antipolis Cedex; France vol. TSG GERAN, no. Sofia, Bulgaria, (Aug. 21, 2013), 1-5.
"On Resource Allocation and System Operation for D2D Discovery", Intel Corporation, 3GPP Draft; R1-134141—Intel—Discovery Resource Allocation, Centre ; 650, Route Des Lucioles ; F-06921 Sophia-Antipolis Cedex ; France vol. RAN WG1, no. Guangzhou, China; Oct. 7, 2013-Oct. 1128, 2013, [Online] retrieved from the internet: :http://www.3gpp.org/ftp/tsg_ran/WG1_RL1/TSGR1_74b/Docs/>, (Oct. 11, 2013), 10 pgs.
"On Support of Inter-cell D2D Discovery", Intel Corporation, 3GPP Draft; R1-140135-Intel-Inter-Cell Discovery, 3rd Generation Partnership Project (3GPP), Mobile Competence Centre ; 650, Route Des Lucioles ; F-06921 Sophia-Antipolis Cedex ; France, [Online] retrieved from the internet: <:http://www.3gpp.org/ftp/tsg_ran/WG1_RL1/TSGR1_76/Docs/>, (Feb. 1, 2014), 6 pgs.
"Remaining details of D2D discovery resource allocation", Intel Corporation, 3GPP Draft; R1-143766_INTEL_DISC0VERYRA, 3rd Generation Partnership Project (3GPP), Mobile Competence Centre ; 650, Route Des Lucioles ; F-06921 Sophia-Antipolis Cedex ; France, XP050875087, [Online] retrieved from the internet: <:http://www.3gpp.org/ftp/Meetings_3GPP_SYNC/RANI/Docs/>, (Oct. 5, 2014), 8 pgs.
"Resource allocation for D2D communication", CATT, 3GPP TSG-RAN WG1#74b R1-134113, 3GPP, (Sep. 28, 2013), 3 pgs.
"Resource allocation for D2D discovery", Alcatel-Lucent Shanghai Bell, Alcatel-Lucent, 3GPP TSG-RAN WG1#74b R1-134232, 3GPP, (Sep. 28, 2013), 3 pgs.
"Resource allocation for D2D discovery", Intel Corporation, 3GPP TSG-RAN WG2#83bis R2-133512, 3GPP, (Sep. 28, 2013), 5 pgs.
Alacatel, Lucent, "Feasibility of coverage extension of physical Channels for MTC devices", 3GPP Draft; R1-130462—REL-12 MTC Coverage—Coverage EXT PHY Channels V0.3, 3rd Generation Partnership Project (3GPP), Mobile Competence Centre ; 650, Route Des Lucioles ; F-06921 Sophia-Antipolis C, [Online] retrieved from the internet: <http://www.3gpp.org/ftp/tsg_ran/WG1_RL1/TSGR1_72/Docs/>, (Jan. 19, 2013), 7 pgs.
Asustek, "Method of resource allocation for D2D discovery", 3GPP Draft; RI-134638 Method of Resource Allocation for D2D Discovery, 3rd Generation Partnership Project (3GPP), Mobile Competence Centre ; 650, Route Des Lucioles ; F-06921 Sophia-Antipolis Cedex, XP050717720, [Online] retrieved from the internet: <:http://www.3gpp.org/ftp/tsg_ran/WGI_RLI/TSGRI_74b/Docs/>, (Sep. 28, 2013), 9 pgs.
Ericsson, et al., "Coverage enhancements for MTC—System informa", 3GPP Draft; R1-131680 Coverage Enhancements for MTC System Information, 3rd Generation Partnership Project (3GPP), Mobile Competence Centre ; 650, Route Des Lucioles ; F-06921 Sophia-Antipolis Cedex, [Online] retrieved from the internet: <http ://www.3gpp.org/ftp/tsg_ran/WG 1 _RLI /TSG R1 _72b/Docs/>, (Apr. 16, 2013), 8 pgs.
Huawei, et al., "Discussion on PRACH coverage improvement and mechanism for determining the amount of needed coverage improvement", 3GPP Draft; RI-134054, 3rd Generation Partnership Project (3GPP), Mobile Competence Centre ; 650, Route Des Lucioles ; F-06921 S0phia-Antip0lis Cedex, (Sep. 28, 2013), 6 pgs.
Huawei, et al., "DRB configuration and switch in dual Connectivity", 3GPP Draft; R2-142062, 3rd Generation Partnership Project (3GPP), Mobile Competence Centre ; 650, Route Des Lucioles ; F-06921 Sophia-Antipolis Cedex ; France, vol. RAN WG2, no. Seoul, South Korea; May 19, 2014-May 23, 2014, [Online] retrieved from the internet: <http://www.3gpp.org/ftp/tsg_ranANG2_RL2/TSGR2_86/Docs/>, (May 10, 2014), 5 pgs.
Intel Corporation, "On D2D Discovery Transmission Timing", 3GPP TSG-RAN, WG1#75, R1-135955, [Online] retrieved from the internet: <http://www.3gpp.org/ftp/tsg_ran/WG1_RL1/TSGR1_75/Docs/R1-135955>, (Nov. 15, 2013), 7 pgs.
Nokia, et al., "D2D Discovery Signal", 3GPP Draft; R1-134538, 3rd Generation Partnership Project (3GPP), Mobile Competence Centre ; 650, Route Des Lucioles ; F-06921 Sophia-Antipolis Cedex ; France [Online] retrieved from the internet: <:http://www.3gpp.org/ftp/tsg_ran/WG1_RL1/TSGR1_74b/ Docs/>, (Sep. 28, 2013), 7 pgs.
Rapportuer, "Introduction of Dual Connectivity (RAN3 topics)", 3GPP Draft; R3-141480-DC-Stage2-01, 3rd Generation Partnership Project (3GPP), Mobile Competence Centre ; 650, Route Des Lucioles ; F-06921 Sophia-Antipolis Cedex ; France, vol. RAN WG3, no. Seoul, South Korea; May 19, 2014-May 23, 2014, [Online] retrieved from the internet: <:http://www.3gpp.org/ftp/tsg_ran/WG3_lu/TSGR3_84/Docs/>, (May 24, 2014), 62 pgs.
"3rd Generation Partnership Project; Technical Specification Group Services and System Aspects; Circuit Switched (CS) fallback in Evolved Packet System (EPS); Stage 2 (Release 12)", 3GPP Standard; 3GPP TS 23.272, 3rd Generation Partnership Project (3GPP), Mobile Competence Centre, F-06921 Sophia-Antipolis Cedex, (Sep. 11, 2013), 1-97.
"U.S. Appl. No. 14/917,154, Non Final Office Action dated Jun. 29, 2017", 7 pgs.
"U.S. Appl. No. 14/917,451, Non Final Office Action dated Jul. 25, 2017", 16 pgs.
"U.S. Appl. No. 15/026,174, Response filed Jul. 20, 2017 to Non Final Office Action dated May 19, 2017", 9 pgs.
"U.S. Appl. No. 15/026,753, Corrected Notice of Allowance dated Aug. 2, 2017", 2 pgs.
"U.S. Appl. No. 15/026,753, Notice of Allowance dated Jul. 19, 2017", 12 pgs.
"U.S. Appl. No. 15/026,788, Notice of Allowance dated Aug. 31, 2017", 7 pgs.
"U.S. Appl. No. 15/026,788, Preliminary Amendment filed Apr. 1, 2016", 9 pgs.
"U.S. Appl. No. 15/026,788, Response filed Jul. 11, 2017 to Non Final Office Action dated Apr. 11, 2017", 11 pgs.
"Backwards compatibility issues with the approved CRs 24.301-15321r1 (C1-123946) and 24.008-22961r1 (C1-124701)", 3GPP Draft; C1-132127-Discussion-Periodic-Update. 3rd Generation Partnership Project, Retrieved from the Internet: URL: <http://www.3gpp.org/ftp/tsg ct/WG1_mm-cc-sm_ex-CN1/TSGC1_83_Chengdu/docs/>, (May 13, 2013), 3 pgs.
"Chinese Application Serial No. 201480051969.X, Voluntary Amendment Filed on Jun. 28, 2017", w/English Claims, 22 pgs.
"Clarification of ISR activation condition for NMO II RAU and Periodic RAU", 3GPP Draft; S2-120327 REV4-S2-120098 23272CR0720 CSFB RAU and ISR REL8 REV04. 3rd Generation Partnership Project (3GPP), Mobile, (Jan. 24, 2012), 2 pgs.
"Clarification of ISR activation condition for Periodic RAU", 3GPP Draft; 82-120097 Clarification of ISR Activation Disc, 3rd-Generation Partnership Project, Mobile Competence Centr, (Jan. 11, 2012), 5 pgs.
"Discussion on Public Safety UE-Network Relays", 3GPP TSG RAN WG1 Meeting #74bis R1-134803, (Oct. 2, 2013).
"European Application Serial No. 14846552.9, Extended European Search Report dated May 17, 2017", 7 pgs.
"European Application Serial No. 14857392.6, Extended European Search Report dated Jun. 20, 2017", 10 pgs.
"Further discussion on CSFB with ISR", 3GPP Draft; S2-120825 WAS S2-120739 CSFB ISR Periodicr, 3rd Generation Partnership Project, Mobile Competence Centr, (Feb. 3, 2012), 26 pgs.
"Indian Application Serial No. 201647004844, Voluntary Amendment filed on Jul. 19, 2017", (W/ English Claims), 17 pgs.
"Japanese Application Serial No. 2016-516873, Response Filed Apr. 28, 2017 to Office Action dated Feb. 7, 2017", (W/ English Claims), 15 pgs.
"Korean Application Serial No. 10-2016-7004885, Office Action dated Jul. 3, 2017", w/English Translation, 8 pgs.
"Korean Application Serial No. 10-2016-7004885, Response filed Sep. 4, 2017 to Office Action dated Jul. 3, 2017", (W/ English Claims), 19 pgs.
"Korean Application Serial No. 10-2016-7008440, Office Action dated Jul. 18, 2017", (W/ English Translation), 5 pgs.
"Korean Application Serial No. 10-2016-7008440, Response Filed Sep. 18, 2017 to Office Action dated Jul. 18, 2017", (W/ English Claims), 14 pgs.

(56) References Cited

OTHER PUBLICATIONS

"Korean Application Serial No. 10-2016-7008440, Voluntary Amendment Filed on Jul. 3, 2017", (W/ English Claims), 26 pgs.
Tao, Yun Wang, et al., "Method and system for processing joint position service Gs interface fault", (Aug. 13, 2008), 6 pgs.
"European Application Serial No. 14857392.6, Response Filed Jan. 17, 2018 to Extended European Search Report dated Jun. 20, 2017", 21 pgs.
"U.S. Appl. No. 14/917,154, Final Office Action dated Oct. 25, 2017", 9 pgs.
"U.S. Appl. No. 14/917,154, Response filed Sep. 29, 2017 to Non Final Office Action dated Jun. 29, 2017", 10 pgs.
"U.S. Appl. No. 14/917,451, Response filed Oct. 25, 2017 to Non Final Office Action dated Jul. 25, 2017", 11 pgs.
"U.S. Appl. No. 15/026,174, Final Office Action dated Nov. 3, 2017", 21 pgs.
"U.S. Appl. No. 15/026,753, Corrected Notice of Allowance dated Oct. 13, 2017", 2 pgs.
"U.S. Appl. No. 15/026,753, Notice of Allowance dated Oct. 19, 2017", 2 pgs.
"European Application Serial No. 14834710.7, Response Filed Oct. 9, 2017 to Extended European Search Report dated Mar. 22, 2017", 55 pgs.
"European Application Serial No. 14858430.3, Response Filed Sep. 25, 2017 to Extended European Search Report dated Mar. 7, 2017", 13 pgs.
"European Application Serial No. 14858666.2, Response Filed Oct. 4, 2017 to Extended European Search Report dated Mar. 7, 2017", 28 pgs.
"European Application Serial No. 14858860.1, Response filed Oct. 30, 2017 to Extended European Search Report dated Mar. 28, 2017", 12 pgs.
"European Application Serial No. 14859145.6, Response Filed Oct. 17, 2017 to Extended European Search Report dated Mar. 22, 2017", 11 pgs.
"European Application Serial No. 17170538.7, Extended European Search Report dated Sep. 12, 2017", 10 pgs.
Mediatek Inc., "On Required System Functionalities for MTC UEs Operating in Enhanced Coverage Mode", R1-130218, 3GPP TSG RAN WG1 Meeting #72, St Julian's, Malta, [Online] retrieved from the Internet: <(http://www.3gpp.org/ftp/tsg_ran/wg1_rl1/TSGR1_72/Docs/R1-130218.zip)>, (Jan. 19, 2013), 6 pgs.

USER EQUIPMENT AND MOBILITY MANAGEMENT ENTITY AND METHODS FOR PERIODIC UPDATE IN CELLULAR NETWORKS

PRIORITY CLAIM

This application is a U.S. National Stage Filing under 35 U.S.C. 371 from International Application No. PCT/US2014/056909, filed Sep. 23, 2014 and published in English as WO 2015/065619 on May 7, 2015, which claims the benefit of priority to U.S. Provisional Patent Application Ser. No. 61/898,425, filed Oct. 31, 2013, each of which is incorporated herein by reference in its entirety.

TECHNICAL FIELD

Embodiments pertain to wireless communications. Some embodiments relate to wireless networks including 3GPP networks. Some embodiments relate to network updates including routing area updates or tracking area updates. Some embodiments relate to networks that support packet-switched and circuit-switched operation.

BACKGROUND

A mobile network may provide voice and data services to mobile devices using a combination of circuit-switched (CS) and packet-switched (PS) components. As an example, voice services may be provided through a CS path while data services may be provided on a PS path. In any case, a cooperative relationship between CS and PS components in the network may be beneficial in terms of system capacity, latency, speed, and user experience.

In some cases, a mobile device engaged in a communication session may need to provide updates, such as a routing area update (RAU) or a tracking area update (TAU), to the network. During these updates, various error conditions or states may sometimes be detected within the network. For instance, networks with significant interaction between CS and PS components may experience such conditions along with possible performance degradation such as lost traffic for the mobile device or high latency during correction procedures. Accordingly, there is a general need for systems and methods of updating the mobile network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
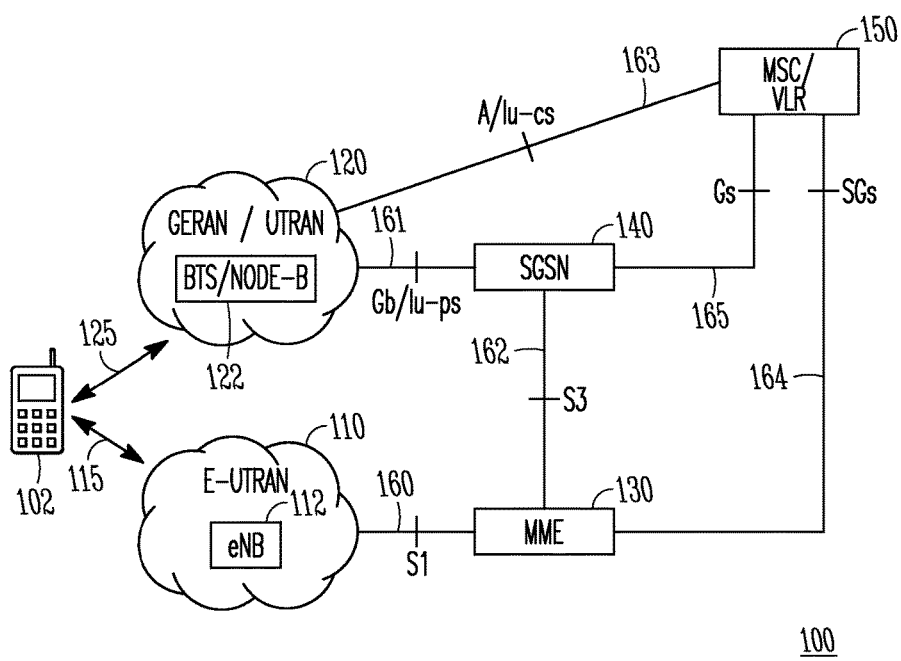
FIG. 1 is a functional diagram of a 3GPP network in accordance with some embodiments.

FIG. 1 shows a portion of an end-to-end network architecture of a 3GPP network with various components of the network in accordance with some embodiments. The network 100 may include one or more radio access networks (RAN) such as the E-UTRAN 110 and the GERAN/UTRAN 120, which may provide air interfaces for the UE 102 to communicate with the network 100 over the links 115 and 125, respectively. It should be noted that although GERAN and UTRAN are two different radio access networks standardized by 3GPP, the GERAN/UTRAN 120 is shown as a single block in FIG. 1 for convenience only. In addition, the term "GERAN/UTRAN" may also be used for convenience, and may refer to a "GERAN or UTRAN." The E-UTRAN 110 may include the eNB 112 and additional eNBs not shown, while the GERAN/UTRAN 120 may include the BTS/Node-B 122 and additional BTSs/Node-Bs not shown. In addition, other components may be included in the E-UTRAN 110 and the GERAN/UTRAN 120, although such components may not be shown in FIG. 1 for ease of illustration. In some embodiments, the E-UTRAN 110 may provide an air interface to the UE 102 for 4G services while the GERAN/UTRAN 120 may provide an air interface to the UE 102 for 3G and/or 2G services.

The network 100 may also include a Mobile Switching Center/Visitor Location Register (MSC/VLR) 150, which may provide, manage or facilitate delivery of circuit-switched (CS) services for the UE 102. The network 100 may also include the Mobility Management Entity (MME) 130, which may provide, manage or facilitate delivery of packet-switched (PS) services for the UE 102 through the E-UTRAN 110. The network 100 may also include the Serving GPRS Support Node (SGSN) 140, which may provide, manage or facilitate delivery of packet-switched (PS) services for the UE 102 through the GERAN/UTRAN 120. The MME 130 and/or the SGSN 140 may manage mobility aspects in access such as gateway selection and tracking area list management.

The MME 130 may be communicatively coupled to the MSC/VLR 150 through the SGs interface 164 and to the E-UTRAN 110 through the S1 interface 160. The SGSN 140 may be communicatively coupled to the MSC/VLR 150 through the Gs interface 165 and to the GERAN 120 through the Gb interface 161 or to the UTRAN 120 through the Iu-ps interface 161. The MSC/VLR 150 may be communicatively coupled to the GERAN 120 through the A interface 163 or to the UTRAN 120 through the Iu-cs interface 163. In addition, the SGSN 140 and MME 130 may be communicatively coupled through the S3 interface 162. It should be noted that the interfaces 161, 163 as shown in FIG. 1 include multiple labels for convenience of illustration only.

In some embodiments, the UE 102 may receive 4G services through a path that includes the E-UTRAN 110 and the MME 130. In some embodiments, the UE 102 may receive 3G services through a path that includes the UTRAN 120 and the SGSN 140, or through a path that includes the UTRAN 120 and the MSC/VLR 150. In some embodiments, the UE 102 may receive 2G services through a path that includes the GERAN 120 and the SGSN 140, or through a path that includes the GERAN 120 and the MSC/VLR 150. These embodiments are not limiting, however, as the components in the network 100 may provide all or some of those or other services in any suitable manner.

The eNB 112 and additional eNBs not shown may operate as base stations for communicating with the UE 102, and may include macro eNBs and low power (LP) eNBs. In addition, these and other components shown in FIG. 1, such as the MME 130, SGSN 140, and MSC/VLR 150, may be implemented in one physical node or separate physical nodes. In some embodiments, an eNB 104 may fulfill various logical functions for the network 100 including but not limited to radio network controller functions such as radio bearer management, uplink and downlink dynamic radio resource management and data packet scheduling, and mobility management.

In accordance with some embodiments, a UE 102 may transmit a registration message for reception at the MME 130 or SGSN 140, which may enable the UE 102 to register with the MME 130 or SGSN 140, and also to register with the MSC/VLR 150. The registration message may also enable an establishment of a signaling session between the MME 130 and the MSC/VLR 150 for the UE 102 or an establishment of a signaling session between the SGSN 140 and the MSC/VLR 150 for the UE 102. These embodiments are described in more detail below.

Figure 2:
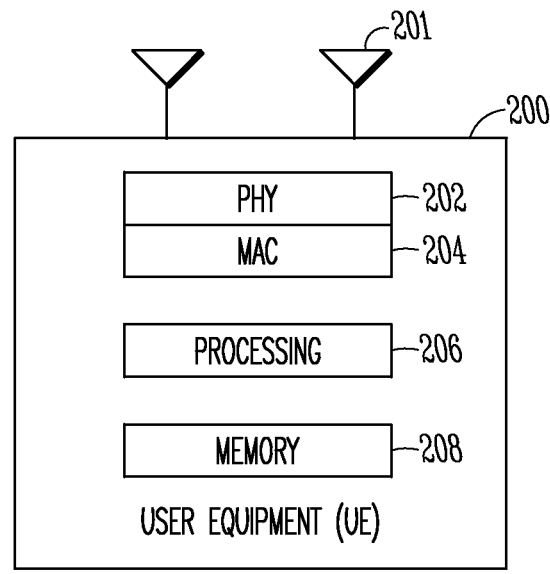
FIG. 2 is a block diagram of a User Equipment (UE) in accordance with some embodiments.
Figure 3:
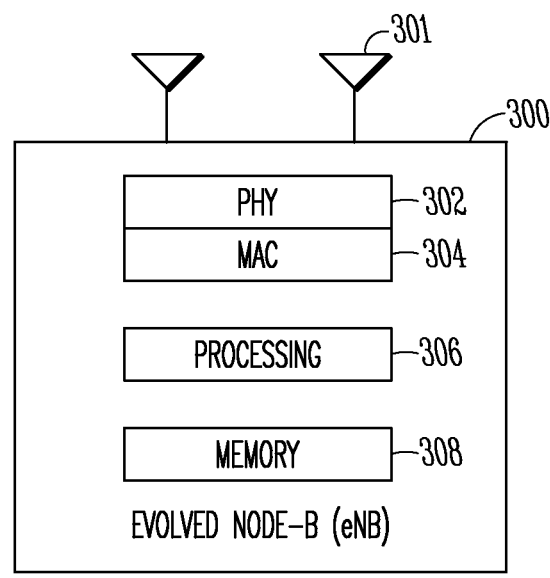
FIG. 3 is a block diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 112 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. In some embodiments, the UE 200, eNB 300 and other mobile or non-mobile devices described or referred to herein may employ physical layer protocols based on OFDM, CDMA or other techniques known in the art. In addition, the physical layer may be used to transport data, control or other information over various channel types that may be part of standards such as 3GPP or others. As an example, data or control messages may be exchanged between the UE 200 to the eNB 300 over channels defined in 3GPP, such as the physical downlink shared channel (PDSCH), physical downlink control channel (PDCCH), physical uplink shared channel (PUSCH), physical uplink control channel (PUCCH) or others, including broadcast channels.

The antennas 201, 301 may be directional or omnidirectional antennas, and may be dipole antennas, monopole antennas, patch antennas, loop antennas, microstrip antennas or other types of antennas suitable for transmission of RF signals. In some embodiments, the antennas 201, 301 may include multiple elements or may support multiple-input multiple-output (MIMO) operation. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

Figure 8:
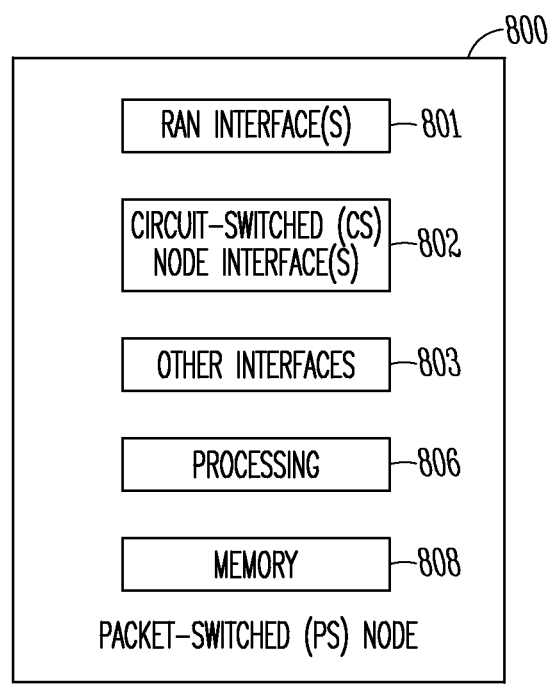
FIG. 8 is a block diagram of a packet-switched (PS) node in accordance with some embodiments.

FIG. 8 shows a block diagram of a Packet-switched (PS) node 800 in accordance with some embodiments. It should be noted that in some embodiments, the PS node 800 may be a stationary non-mobile device. The PS node may be an MME 130 or an SGSN 140 as depicted in FIG. 1, but is not limited as such. The PS node 800 may include processing circuitry 806 and memory 808 arranged to perform the operations described herein. The PS node may also include one or more radio access network (RAN) interface(s) 801, CS node interface(s) 802 or other interfaces 803. As shown in FIG. 8, the interfaces 801, 802, 803 may enable the PS node 800 to be communicatively coupled to other components in the network.

As an example, when the PS node 800 is an MME 130, the RAN interface 801 may enable or facilitate communication with the E-UTRAN 110 over the S1 interface 160 or may be at least partially included in the S1 interface 160. In addition, the CS-node interface 802 may enable or facilitate communication with the MSC/VLR 150 over an SGs interface association 164 established between the MME 130 and the MSC/VLR 150. As another example, when the PS node is an SGSN 140, the RAN interface 801 may enable or facilitate communication with the GERAN/UTRAN 120 over the Gb/Iu-ps interface 161 or may be at least partially included in the Gb/Iu-ps interface 161. In addition, the CS-node interface 802 may enable or facilitate communication with the MSC/VLR 150 over a Gs interface association 165 established between the SGSN 140 and the MSC/VLR 150.

Although the UE 200, eNB 300, and PS node 800 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In cellular networks such as 3GPP networks or others, a UE 102 registered to the network may perform location update, routing area update (RAU) or tracking area update (TAU) procedures. Such procedures (which may be periodic or non-periodic) may inform the network that the UE 102 wishes to remain registered with the network, and may also enable the UE 102 to verify its registration with the network and to verify that the network is still operational. The UE 102 may wish to receive both CS and PS services from the network. In some cases, both services may be set up and managed by a PS node that may register the UE 102 with a CS node. Such a combined mobility management procedure may be advantageous in terms of the number of signaling messages transmitted by the UE 102 over the air interface.

Figure 4:
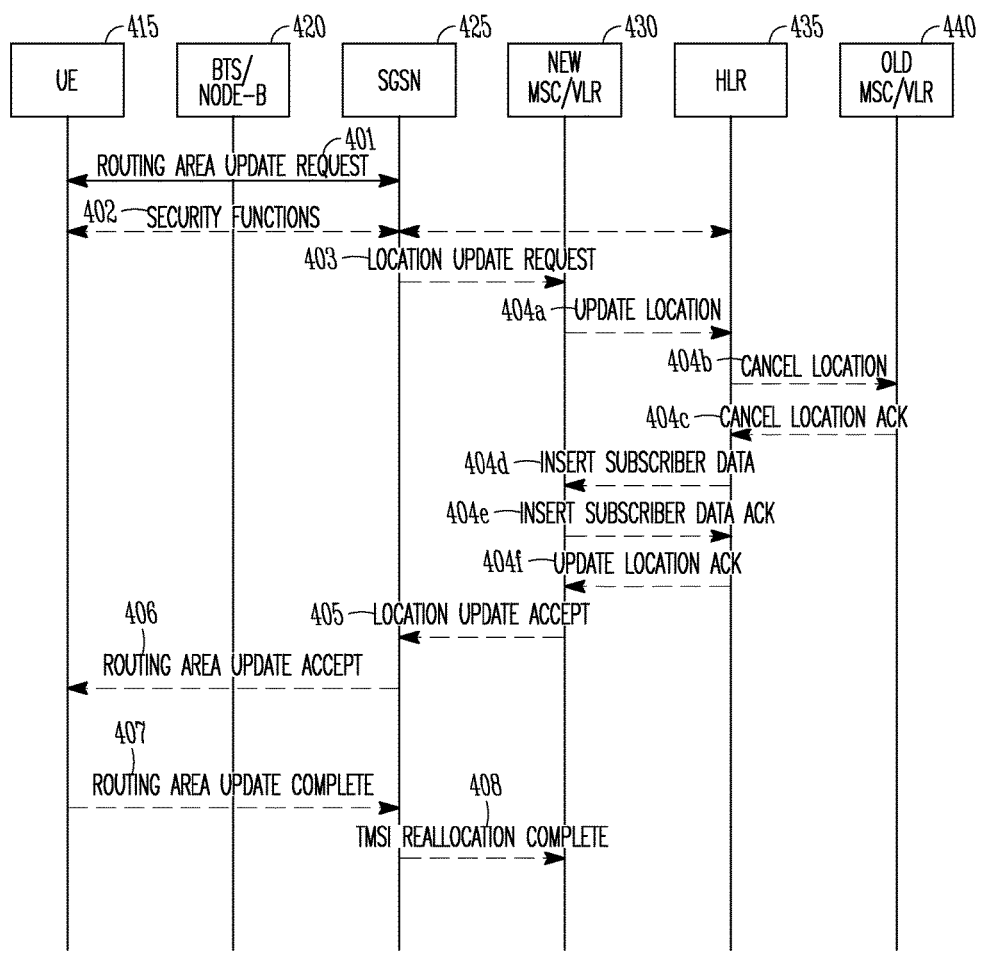
FIG. 4 illustrates an example of a combined Routing Area Update (RAU) in accordance with some embodiments.

Referring to FIG. 4, a signaling diagram for an example of a combined Routing Area Update (RAU) for a UE 415 that is to receive both CS and PS services is shown. In the example, an update may be performed such that the UE 415 receives CS services from the new MSC/VLR 430 after previously receiving CS services from the old MSC/VLR 440. The UE 415 may receive PS services from the SGSN 425, which may also perform registration of the UE 415 with the new MSC/VLR 430 through a combined RAU or combined attach procedure. The network may include the eNB 420 and a Home Location Register (HLR) 435, and may also include other components not shown.

The combined RAU may include the RAU Request at operation 401 between the UE 415 and the SGSN 425 and a Location Update Request at operation 403 between the SGSN 425 and the new MSC/VLR 430. After operation 405, the SGSN 425 and the new MSC/VLR 430 may have a Gs interface association established between them, and the Gs interface association in the SGSN 425 and in the new MSC/VLR 430 may be in a state of "Gs-associated."

Figure 5:
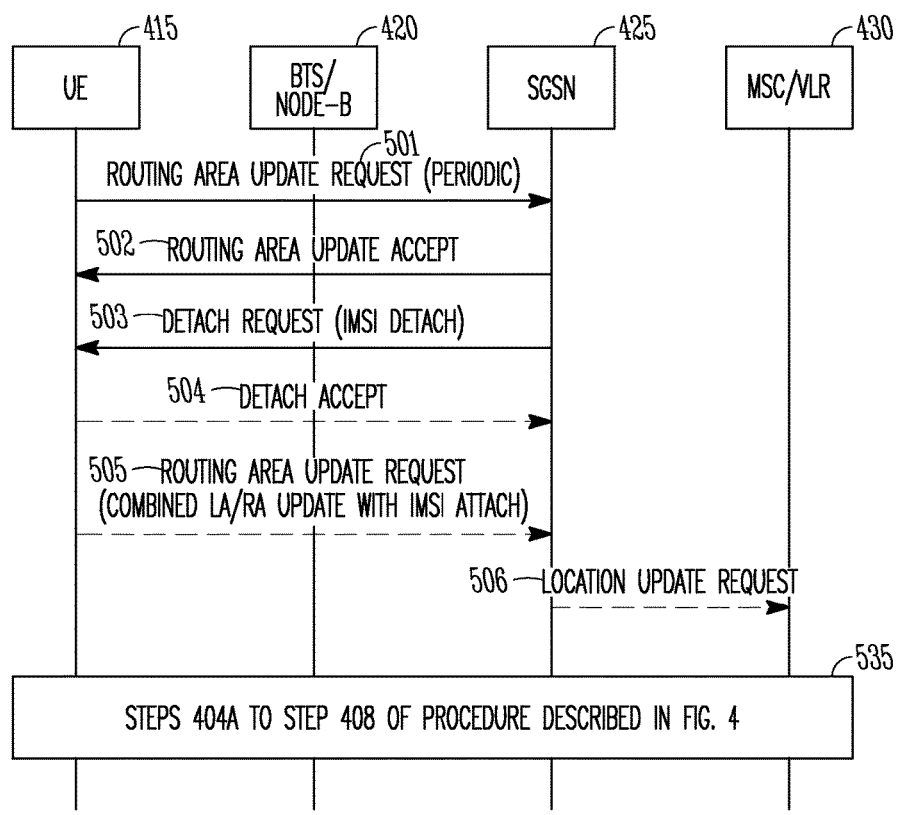
FIG. 5 illustrates an example of a periodic RAU in accordance with some embodiments.

Referring to FIG. 5, a signaling diagram for an example of a periodic RAU for the UE 415 is shown. During a periodic RAU, the SGSN 425 may not report or exchange messages with the MSC/VLR 430, and the state of the Gs interface may not be changed. That is, the RAU Request in operation 501 and the RAU Accept in operation 502 may be exchanged between the UE 415 and the SGSN 425 without information passed along to the MSC/VLR 430.

In some cases, error conditions or operational conditions at the MSC/VLR 430 may occur, and may be known at the SGSN 425 when the UE 415 performs the periodic RAU of operation 501 of FIG. 5. As an example, the MSC/VLR 430 may perform a reset and may inform the SGSN 425 of its occurrence. As another example, the SGSN 425 may determine a "long-term outage" on the signaling link between the MSC/VLR 430 and the SGSN 425. As another example, an operator may take the MSC/VLR 430 out of service for maintenance or other purposes which may or may not be related to error conditions. This list of examples is not limiting, however, as error conditions or operational conditions may result from other events and may also be known at the SGSN 425 when the UE 415 performs operation 501.

In some cases, when such error conditions or operational conditions occur, the SGSN 425 may accept the periodic RAU Request from the UE 415 at operation 501 and may respond to the UE 415 with a RAU Accept at operation 502 and with a Detach Request (IMSI Detach) at operation 503. The UE 415 may respond with a Detach Accept at operation 504 and a "combined Location Area/Routing Area (LA/RA) Update with IMSI Attach" message at operation 505. The combined RAU message at operation 505 may request or cause the SGSN 425 to send a Location Update Request to the MSC/VLR 430 at operation 506, which may re-establish the Gs association that may have been broken as a result of the previously described error conditions or operational conditions or other conditions. It should be noted that in comparison to the example shown in FIG. 4, the signaling flow shown in FIG. 5 includes the exchanging of four additional messages between the UE 415 and the SGSN 425, from the RAU Accept at operation 502 until the "combined LA/RA Update with IMSI Attach" message at operation 505. Accordingly, the transmission of those additional messages by the UE 415 and the SGSN 425 over the air interface may be considered disadvantageous.

In other cases, when such error conditions or operational conditions occur, when the Gs interface association in the SGSN 425 is in a state of "Gs-associated," the SGSN 425 may internally change the type of the RAU Request from "periodic" to "combined LA/RA Update with IMSI attach." The SGSN 425 may further signal a Location Update Request to the MSC/VLR 430 as in operation 403 of FIG. 4, which may re-establish the Gs association that may have been broken as a result of the previously described error conditions or operational conditions or other conditions. It should be noted that if a further error condition occurs during this procedure after the signaling of a Location Update Request to the MSC/VLR 430, as the UE 415 has not been informed about the change of the type of the RAU Request, the SGSN 425 may be responsible for correcting error conditions related to the state of the Gs association. Accordingly, such additional complexity in the SGSN implementation may be considered disadvantageous.

In accordance with embodiments, the UE 102 may include hardware processing circuitry to transmit, for reception at a PS node of the mobile network, a registration message for registration with the PS node and a CS node of the mobile network and for an establishment of a signaling session between the PS node and the CS node for the UE 102. The hardware processing circuitry may be further to transmit, for reception at the PS node, a periodic registration update message for remaining registered with the PS node. In some embodiments, the periodic registration update message may include a signaling permission indicator for a re-establishment, by the PS node, of the signaling session between the PS node and the CS node for the UE 102. These embodiments are described in more detail below.

Figure 6:
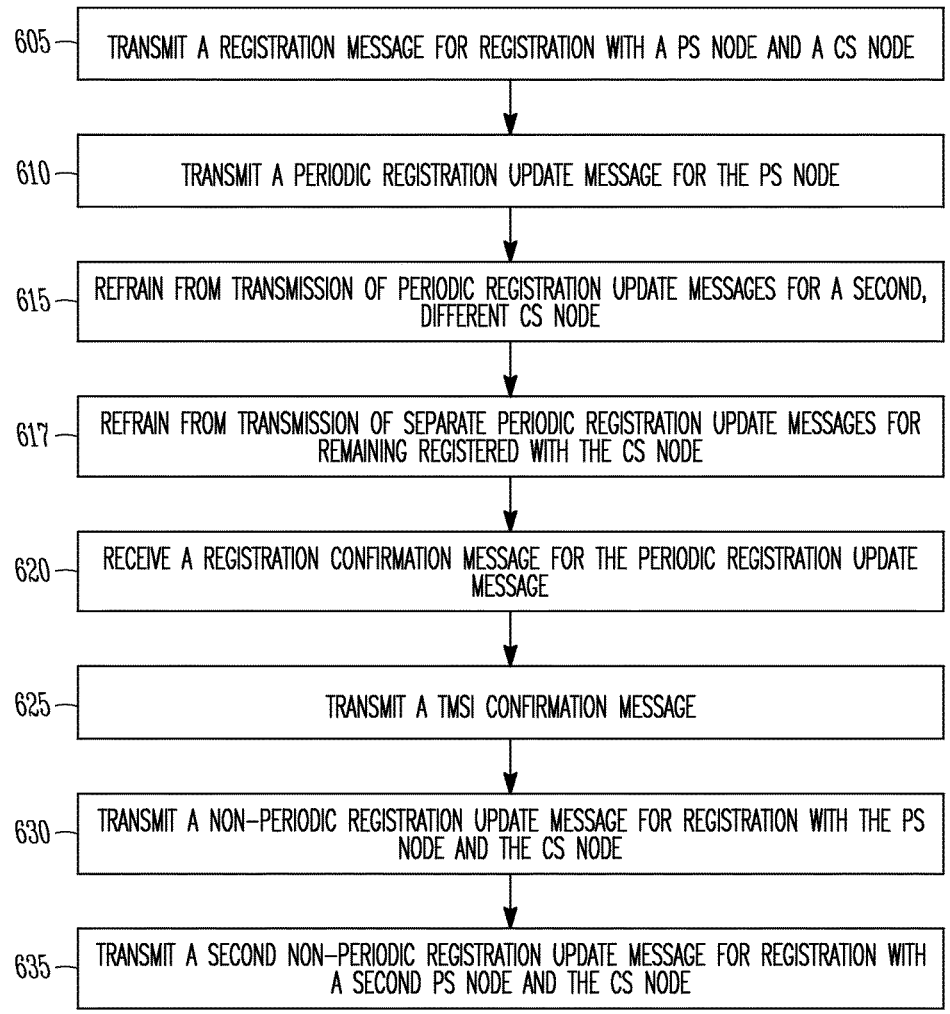
FIG. 6 illustrates a method for operating in a mobile network in accordance with some embodiments.

Referring to FIG. 6, a method 600 of operating in a mobile network that supports packet-switched (PS) and circuit-switched (CS) communication is shown. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7, although it is understood that the method 600 may be practiced with any other suitable systems, interfaces and components.

In addition, while the method 600 and other methods described herein may refer to eNBs 112 or UEs 102 operating in accordance with 3GPP or other standards, embodiments of those methods are not limited to just those eNBs 112 or UEs 102 and may also be practiced on other mobile devices, such as a Wi-Fi access point (AP) or user station (STA). Moreover, the method 600 and other methods described herein may be practiced by wireless devices configured to operate in other suitable types of wireless communication systems, including systems configured to operate according to various IEEE standards such as IEEE 802.11.

At operation 605 of the method 600, a registration message may be transmitted by the UE 102 for reception at a PS node of a mobile network, such as the network 100. The registration message may be for registration with the PS node and a CS node of the mobile network and for an establishment of a signaling session between the PS node and the CS node for the UE 102. In some embodiments, the mobile network may be a 3GPP network, the PS node may be an MME 130, and the CS node may be an MSC/VLR 150. In some embodiments, the mobile network may be a 3GPP network, the PS node may be an SGSN 140, and the CS node may be an MSC/VLR 150. In some embodiments, the registration message may be an initial registration message. In some embodiments, establishment or re-establishment of the signaling session may include establishing or re-establishing the SGs interface association via the SGs interface 164 between the MME 130 and the MSC/VLR 150. In some embodiments, establishment or re-establishment of the signaling session may include establishing or re-establishing the Gs interface association via the Gs interface 165 between the SGSN 140 and the MSC/VLR 150.

At operation 610 of the method 600, a periodic registration update message for remaining registered with the PS node may be transmitted. In some embodiments, the periodic registration update message may be for renewing a registration with the PS node. The periodic registration update message may include a signaling permission indicator for a re-establishment, by the PS node, of the signaling session between the PS node and the CS node for the UE. In some embodiments, the periodic registration update message may further include an indication of whether or not the use of the signaling permission indicator is supported. The indication may also refer to whether or not a periodic updating method that utilizes the signaling permission indicator is supported. In some embodiments, the re-establishment of the signaling session may be an operation or process that is performed only if necessary. As an example, after an MSC/VLR reset is performed, the signaling session may need to be re-established.

At operation 615 of the method 600, the UE 102 may refrain from transmission of periodic registration update messages for a second, different CS node. In some embodiments, the PS node may be engaged in a first signaling session with a first CS node (as referenced in operations 605 and 610, for instance) for the UE 102 and may have previously engaged in a second, different signaling session with the second CS node for the UE 102. As a non-limiting example scenario, the first CS node may be considered a "new" node to which the UE 102 may register, or wish to register, for CS services while the second CS node may be considered an "old" node previously used by the UE 102 for CS services.

At operation 617 of the method 600, the UE 102 may refrain from transmission of separate periodic registration update messages for remaining registered with the CS node. That is, due to the presence of a signaling session between the PS node and the CS node over the Gs interface, for example, it may not be necessary or beneficial for the UE 102 to send these and other messages associated with the CS node.

At operation 620 of the method 600, a registration confirmation message for the periodic registration update message may be received at the UE 102. The registration confirmation message may be received from the PS node, and may include a registration acceptance indicator for the PS node. In some embodiments, the registration confirmation message may further include a registration acceptance indicator for the CS node. Accordingly, the registration acceptance indicators may be Boolean, taking on possible values such as fail/pass, yes/no or similar, which may be mapped in any suitable manner to a field of one or more bits. These indicators are not so limited, however, and may also include other information, flags or descriptive messages that provide more information than just whether or not a failure or success has occurred.

At operation 625, a temporary mobile subscriber identity (TMSI) confirmation message that indicates reception of the TMSI may be transmitted by the UE 102. In some embodiments, the transmission may occur when the registration confirmation message includes the received TMSI or in response to a successful reception or decoding of the TMSI at the UE 102. In some embodiments, the transmission of the TMSI confirmation message may occur when the signaling permission indicator of the periodic registration update message grants permission to the PS node for the re-establishment of the signaling session between the PS node and the CS node. In some embodiments, the TMSI may be for the registration of the UE 102 with the CS node.

At operation 630 of the method 600, a non-periodic registration update message for registration with the PS node and the CS node may be transmitted by the UE 102 for reception at the PS node. The non-periodic registration update message may also be for a re-establishment, by the PS node, of the signaling session between the PS node and the CS node for the UE. In some embodiments, the non-periodic registration update message may be a combined Location Area/Routing Area (LA/RA) Update message with International Mobile Subscriber Identity (IMSI) attach. In some embodiments, the non-periodic registration update message may be a combined Location Area/Tracking Area (LA/TA) Update message with IMSI attach.

The transmission of the non-periodic registration update message may occur under certain conditions or in response to certain events. As an example, a first condition or event may be that the signaling permission indicator of the periodic registration update message grants permission to the PS node for the re-establishment of the signaling session between the PS node and the CS node. As another example, a second condition or event may be that the registration confirmation message includes a failure indication for the re-establishment of the signaling session between the PS node and the CS node. As another example, a third condition or event may be a failure, at the UE 102, to receive the registration confirmation message.

The previous examples of conditions or events are not exhaustive or limiting, and other suitable conditions or events may be used. The non-periodic registration update message may be transmitted in response to any suitable group of these and other conditions or events. As an example, the transmission may occur in response to the first and second conditions or events described previously. As another example, the transmission may occur in response to the first and third conditions or events described previously.

In some embodiments, the registration confirmation message may include a signaling session failure indicator for the re-establishment of the signaling session between the PS node and the CS node. The signaling session failure indicator may be Boolean, taking on possible values such as fail/pass, yes/no or similar, which may be mapped in any suitable manner to a field of one or more bits. The signaling session failure indicator is not so limited, however, and may also include other information, flags or descriptive messages that provide more information than just whether or not a failure or success has occurred. As an example, the previously described failure indication for the re-establishment of the signaling session may result from the signaling session failure indicator taking on the value of "fail" or "yes" or similar.

Returning to the method 600, at operation 635, a second non-periodic registration update message may be transmitted by the UE 102. In some embodiments, the second non-periodic registration update message may be for registration with a second PS node and for an establishment, by the second PS node, of a second, different signaling session between the second PS node and the CS node for the UE.

Before, during or after the transmission of the second non-periodic registration update message, the UE 102 may be registered with a first PS node and the CS node, and the first PS node may be engaged in a signaling session with the CS node for the UE 102. In some embodiments, the first PS node may be an SGSN while the second PS node may be an MME. Accordingly, transmission of the second non-periodic registration update message for registration with the MME may serve to switch the UE 102 from receiving PS services on a 3G path through the SGSN to receiving PS services on a 4G path through the MME. In some embodiments, the CS services may remain with the same MSC/VLR during the switching of PS services between 3G and 4G for the UE 102.

It should be noted that exchanging of messages between the UE 102 and the PS node or the CS node may take place over indirect paths. As previously described in reference to the network 100, one such path may include the GERAN/UTRAN 120 and the Node-B 122, and may be used for 2G or 3G services. Another such path may include the E-UTRAN 110 and eNB 112, and may be used for 4G services.

Figure 7:
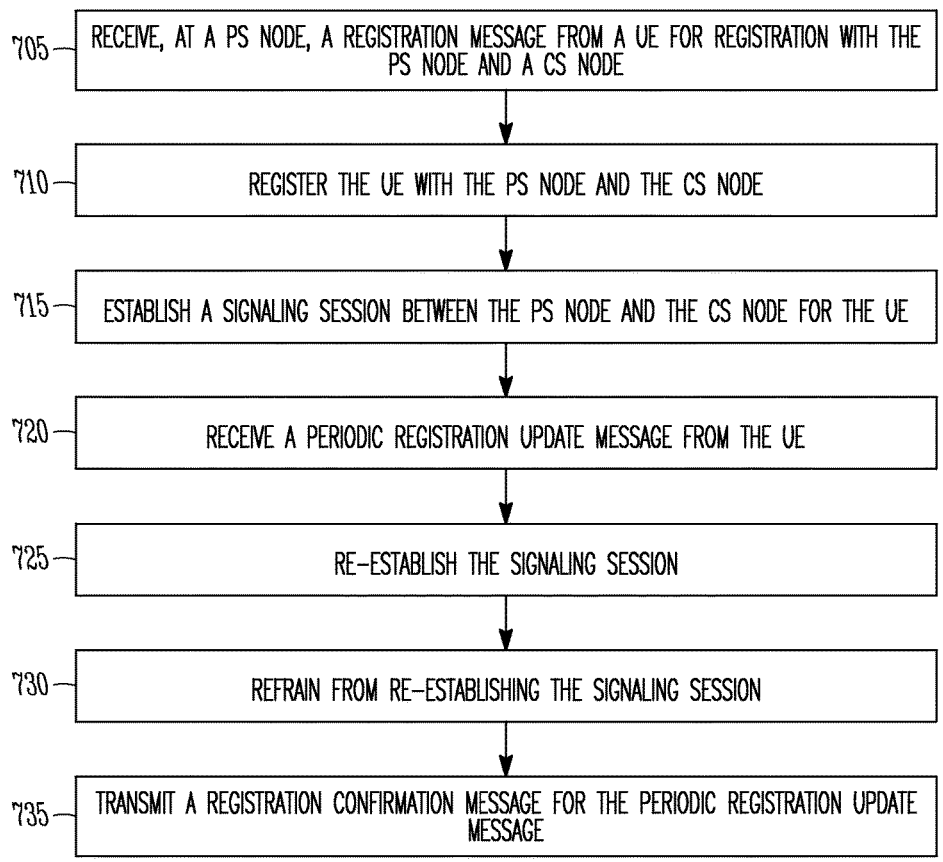
FIG. 7 illustrates another method for operating in a mobile network in accordance with some embodiments.

Referring to FIG. 7, another method 700 of operating in a mobile network that supports packet-switched (PS) and circuit-switched (CS) communication is shown. As mentioned previously regarding the method 600, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6, although it is understood that the method 700 may be practiced with any other suitable systems, interfaces and components. In addition, embodiments of the method 700 may refer to eNBs 112, UEs 102, APs, STAs or other wireless or mobile devices.

It should be noted that operations included in the method 700 may be similar or analogous to operations included in the method 600, and previous discussion and techniques regarding the operations in embodiments of one of the methods 600, 700 may also apply to some embodiments of the other method. For instance, operation 610 refers to transmission of a periodic registration update message by the UE, while operation 720 refers to reception of a periodic registration update message at the PS node. Techniques and discussion related to periodic registration update messages in either operation may be applied to the other operation, in some cases.

At operation 705, a registration message may be received at a PS node of a mobile network from the UE 102. The registration message may be for registration with the PS node and a CS node of the mobile network and for an establishment of a signaling session between the PS node and the CS node for the UE 102. In some embodiments, the registration message may be an initial registration message. In some embodiments, the mobile network may be a 3GPP network, the PS node may be an MME, and the CS node may be an MSC/VLR. In some embodiments, the mobile network may be a 3GPP network, the PS node may be an SGSN, and the CS node may be an MSC/VLR.

At operation 710, the PS node may register the UE 102 with the PS node and with the CS node. The registration may be performed, by the PS node, in response to the reception of the registration message at the PS node. At operation 715, the PS node may establish a signaling session between the PS node and the CS node for the UE 102. The establishment of the signaling session may be performed, by the PS node, in response to the reception of the registration message at the PS node.

At operation 720, a periodic registration update message may be received at the PS node from the UE 102. The periodic registration update message may be for remaining registered with the PS node and may include a signaling permission indicator for a re-establishment, by the PS node, of the signaling session between the PS node and the CS node for the UE. In some embodiments, the periodic registration update message may be for renewing a registration with the PS node. In some embodiments, the periodic registration update message may further include an indication of whether or not the use of the signaling permission indicator is supported. The indication may also refer to whether or not a periodic updating method that utilizes the signaling permission indicator is supported. In some embodiments, the periodic registration update message received at operation 720 may be the same as, or similar to, the periodic registration update message transmitted by the UE 102 at operation 610, but is not limited as such.

At operation 725, the signaling session between the PS node and the CS node for the UE 102 may be re-established by the PS node. At operation 730, the PS node may refrain from re-establishing the signaling session between the PS node and the CS node for the UE 102. As described previously, embodiments of the method 700 are not limited to including all of the operations shown in FIG. 7. Accordingly, some embodiments may not include both of operations 725 and 730. In addition, the PS node may refrain from re-establishing the signaling session between the PS node and the CS node for the UE when the signaling permission indicator declines permission to the PS node for the re-establishment of the signaling session.

At operation 735 of the method 700, a registration confirmation message for the periodic registration update message may be transmitted for reception at the UE 102. In some embodiments, registration confirmation message may include a registration acceptance indicator for the PS node. In some embodiments, the registration confirmation message may further include a registration acceptance indicator for the CS node. Accordingly, the registration acceptance indicators may be Boolean, taking on possible values such as fail/pass, yes/no or similar, which may be mapped in any suitable manner to a field of one or more bits. These indicators are not so limited, however, and may also include other information, flags or descriptive messages that provide more information than just whether or not a failure or success has occurred. In some embodiments, the registration confirmation message may further include a temporary mobile subscriber identity (TMSI) for the registration of the UE 102 with the CS node.

A User Equipment (UE) to operate in a mobile network that supports packet-switched (PS) and circuit-switched (CS) communication is disclosed herein. The UE may include hardware processing circuitry to transmit, for reception at a PS node of the mobile network, a registration message for registration with the PS node and a CS node of the mobile network and for an establishment of a signaling session between the PS node and the CS node for the UE. The hardware processing circuitry may be further to transmit, for reception at the PS node, a periodic registration update message for remaining registered with the PS node. In some embodiments, the periodic registration update message may further include a signaling permission indicator for a re-establishment, by the PS node, of the signaling session between the PS node and the CS node for the UE. The hardware processing circuitry may be further to refrain from transmission of periodic registration update messages for a second, different CS node previously engaged in a second, different signaling session with the PS node for the UE. The hardware processing circuitry may be further to refrain from transmission of separate periodic registration update messages for remaining registered with the CS node.

The hardware processing circuitry may be further to receive, from the PS node, a registration confirmation message for the periodic registration update message that includes a registration acceptance indicator for the PS node. In some embodiments, when the signaling permission indicator of the periodic registration update message grants permission to the PS node for the re-establishment of the signaling session between the PS node and the CS node, the hardware processing circuitry may be further to transmit, when the registration confirmation message includes a temporary mobile subscriber identity (TMSI) for the registration of the UE with the CS node, a TMSI confirmation message that indicates reception of the TMSI.

In some embodiments, when the signaling permission indicator of the periodic registration update message grants permission to the PS node for the re-establishment of the signaling session between the PS node and the CS node, the hardware processing circuitry may be further to transmit, when the registration confirmation message includes a failure indication for the re-establishment of the signaling session between the PS node and the CS node, a non-periodic registration update message. In some embodiments, the non-periodic registration update message may be for registration with the PS node and the CS node and for a re-establishment, by the PS node, of the signaling session between the PS node and the CS node for the UE. In some embodiments, the non-periodic registration update message may be a combined Location Area/Routing Area (LA/RA) Update message with International Mobile Subscriber Identity (IMSI) attach. In some embodiments, the non-periodic registration update message may be a combined Location Area/Tracking Area (LA/TA) Update message with IMSI attach.

In some embodiments, when the signaling permission indicator of the periodic registration update message grants permission to the PS node for the re-establishment of the signaling session between the PS node and the CS node, the hardware processing circuitry may be further to transmit, in response to a failure to receive the registration confirmation message, a non-periodic registration update message. In some embodiments, the non-periodic registration update message may be for registration with the PS node and the CS node and for a re-establishment, by the PS node, of the signaling session between the PS node and the CS node for the UE. In some embodiments, the non-periodic registration update message may be a combined Location Area/Routing Area (LA/RA) Update message with IMSI attach. In some embodiments, the non-periodic registration update message may be a combined Location Area/Tracking Area (LA/TA) Update message with IMSI attach.

In some embodiments, the mobile network may be a 3GPP network, the PS node may be a Mobility Management Entity (MME), and the CS node may be a Mobile Switching Center/Visitor Location Register (MSC/VLR). In some embodiments, the mobile network may be a 3GPP network, the PS node may be a Serving GPRS Support Node (SGSN), and the CS node may be an MSC/VLR. In some embodiments, the PS node may be a Serving GPRS Support Node (SGSN) and the hardware processing circuitry may be further to transmit, for reception at an MME of the mobile network, a second, non-periodic registration update message for registration with the MME and for an establishment, by the MME, of a second, different signaling session between the MME and the CS node for the UE.

A non-transitory computer-readable storage medium that stores instructions for execution by one or more processors to perform operations for communication in a wireless network is disclosed herein. The operations may configure the one or more processors to transmit, for reception at a PS node of the mobile network, a registration message for registration with the PS node and a CS node of the mobile network and for an establishment of a signaling session between the PS node and the CS node for the UE and transmit, for reception at the PS node, a periodic registration update message for remaining registered with the PS node. In some embodiments, the periodic registration update message may further include a signaling permission indicator for a re-establishment, by the PS node, of the signaling session between the PS node and the CS node for the UE. The operations may further configure the one or more processors to receive, from the PS node, a registration confirmation message for the periodic registration update message that includes a registration acceptance indicator for the PS node.

The operations may further configure the one or more processors to, when the signaling permission indicator of the periodic registration update message grants permission to the PS node for the re-establishment of the signaling session between the PS node and the CS node and when the registration confirmation message includes a temporary mobile subscriber identity (TMSI) for the registration of the UE with the CS node, transmit a TMSI confirmation message that indicates reception of the TMSI.

The operations may further configure the one or more processors to, when the signaling permission indicator of the periodic registration update message grants permission to the PS node for the re-establishment of the signaling session between the PS node and the CS node and when the registration confirmation message includes a failure indication for the re-establishment of the signaling session between the PS node and the CS node, transmit a non-periodic registration update message. In some embodiments, the non-periodic registration update message may be for registration with the PS node and the CS node and for a re-establishment, by the PS node, of the signaling session between the PS node and the CS node for the UE.

The operations may further configure the one or more processors to, when the signaling permission indicator of the periodic registration update message grants permission to the PS node for the re-establishment of the signaling session between the PS node and the CS node, transmit a non-periodic registration update message. In some embodiments, the non-periodic registration update message may be for registration with the PS node and the CS node and for a re-establishment, by the PS node, of the signaling session between the PS node and the CS node for the UE and the transmission may be in response to a failure to receive the registration confirmation message. In some embodiments, the registration confirmation message may be in response to the periodic registration update message.

In some embodiments, the mobile network may be a 3GPP network, the PS node may be a Mobility Management Entity (MME) or a Serving GPRS Support Node (SGSN), and the CS node may be a Mobile Switching Center/Visitor Location Register (MSC/VLR).

A method of operation in a mobile network that supports packet-switched (PS) and circuit-switched (CS) communication is disclosed herein. The method may include transmitting, for reception at a PS node of the mobile network, a registration message for registration with the PS node and a CS node of the mobile network and for an establishment of a signaling session between the PS node and the CS node for the UE. The method may further include transmitting, for reception at the PS node, a periodic registration update message for remaining registered with the PS node.

In some embodiments, the periodic registration update message may further include a signaling permission indicator for a re-establishment, by the PS node, of the signaling session between the PS node and the CS node for the UE. The method may further include receiving, from the PS node, a registration confirmation message for the periodic registration update message that includes a registration acceptance indicator for the PS node. In some embodiments, the mobile network may be a 3GPP network, the PS node may be a Mobility Management Entity (MME) or a Serving GPRS Support Node (SGSN), and the CS node may be a Mobile Switching Center/Visitor Location Register (MSC/VLR).

A packet-switched (PS) node to operate in a mobile network that supports packet-switched (PS) and circuit-switched (CS) communication is disclosed herein. The PS node may comprise hardware processing circuitry to receive, from a User Equipment (UE), a registration message for registration with the PS node and a CS node of the mobile network and for an establishment of a signaling session between the PS node and the CS node for the UE. The hardware processing circuitry may be further to register the UE with the PS node and the CS node and to establish the signaling session between the PS node and the CS node. The hardware processing circuitry may be further to receive, from the UE, a periodic registration update message for remaining registered with the PS node that includes a signaling permission indicator for a re-establishment, by the PS node, of the signaling session between the PS node and the CS node for the UE. The hardware processing circuitry may be further to re-establish the signaling session between the PS node and the CS node for the UE in response to a determination of an error condition for the signaling session at the CS node and further in response to the reception of the periodic registration update message from the UE.

The hardware processing circuitry may be further to refrain from re-establishing the signaling session between the PS node and the CS node for the UE when the signaling permission indicator declines permission to the PS node for the re-establishment of the signaling session. The hardware processing circuitry may be further to transmit, for reception at the UE, a registration confirmation message for the periodic registration update message that includes a registration acceptance indicator for the PS node. In some embodiments, the mobile network may be a 3GPP network, the PS node may be a Mobility Management Entity (MME) or a Serving GPRS Support Node (SGSN), and the CS node may be a Mobile Switching Center/Visitor Location Register (MSC/VLR).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A User Equipment (UE) to operate in a mobile network that supports packet-switched (PS) and circuit-switched (CS) communication, the UE comprising transceiver circuitry; and hardware processing circuitry, the hardware processing circuitry configured to:
   encode, for transmission to a PS node of the mobile network, a registration message for registration with the PS node and a CS node of the mobile network and for an establishment of a signaling session between the PS node and the CS node for the UE;
   encode, for transmission to the PS node, a periodic registration update message for remaining registered with the PS node in response to a change in a state of the CS node, wherein the periodic registration update message further includes a signaling permission indicator to grant permission for a re-establishment, by the PS node, of the signaling session between the PS node and the CS node for the UE;
   receive, from the PS node, a registration confirmation message for the periodic registration update message that includes a registration acceptance indicator for the PS node; and
   encode for transmission to the PS node, when the registration confirmation message includes a temporary mobile subscriber identity (TMSI) for the registration of the UE with the CS node, a TMSI confirmation message that indicates reception of the TMSI.

2. The UE according to claim 1, the hardware processing circuitry further to refrain from encoding separate periodic registration update messages for remaining registered with the CS node.

3. The UE according to claim 1, wherein when the signaling permission indicator of the periodic registration update message grants permission to the PS node for the re-establishment of the signaling session between the PS node and the CS node:
   the hardware processing circuitry is further to encode for transmission to the PS node, when the registration confirmation message includes a failure indication for the re-establishment of the signaling session between the PS node and the CS node, a non-periodic registration update message for registration with the PS node and the CS node and for a re-establishment, by the PS node, of the signaling session between the PS node and the CS node for the UE.

4. The UE according to claim 3, wherein the non-periodic registration update message is a combined Location Area/Routing Area (LA/RA) Update message with International Mobile Subscriber Identity (IMSI) attach or a combined Location Area/Tracking Area (LA/TA) Update message with International Mobile Subscriber Identity (IMSI) attach.

5. The UE according to claim 1, wherein when the signaling permission indicator of the periodic registration update message grants permission to the PS node for the re-establishment of the signaling session between the PS node and the CS node:
the hardware processing circuitry is further to encode for transmission to the PS node, in response to a failure to receive the registration confirmation message, a non-periodic registration update message for registration with the PS node and the CS node and for a re-establishment, by the PS node, of the signaling session between the PS node and the CS node for the UE.

6. The UE according to claim 5, wherein the non-periodic registration update message is a combined Location Area/Routing Area (LA/RA) Update message with International Mobile Subscriber Identity (IMSI) attach or a combined Location Area/Tracking Area (LA/TA) Update message with International Mobile Subscriber Identity (IMSI) attach.

7. The UE according to claim 1, wherein:
the mobile network is a 3GPP network;
the PS node is a Mobility Management Entity (MME); and
the CS node is a Mobile Switching Center/Visitor Location Register (MSC/VLR).

8. The UE according to claim 1, wherein:
the mobile network is a 3GPP network;
the PS node is a Serving GPRS Support Node (SGSN); and
the CS node is a Mobile Switching Center/Visitor Location Register (MSCNLR).

9. The UE according to claim 1, wherein:
the PS node is a Serving GPRS Support Node (SGSN); and
the hardware processing circuitry is further to encode for transmission to the PS node, for reception at a Mobility Management Entity (MME) of the mobile network, a second, non-periodic registration update message for registration with the MME and for an establishment, by the MME, of a second, different signaling session between the MME and the CS node for the UE.

10. A non-transitory computer-readable storage medium that stores instructions for execution by one or more processors to perform operations for communication in a wireless network, the operations to configure the one or more processors to:
encode, for transmission to a PS node of the mobile network, a registration message for registration with the PS node and a CS node of the mobile network and for an establishment of a signaling session between the PS node and the CS node for the UE;
encode, for transmission to the PS node, a periodic registration update message for remaining registered with the PS node in response to a change in a state of the CS node, wherein the periodic registration update message further includes a signaling permission indicator to grant permission for a re-establishment, by the PS node, of the signaling session between the PS node and the CS node for the UE;
receive, from the PS node, a registration confirmation message for the periodic registration update message that includes a registration acceptance indicator for the PS node; and
encode for transmission to the PS node, when the registration confirmation message includes a temporary mobile subscriber identity (TMSI) for the registration of the UE with the CS node, a TMSI confirmation message that indicates reception of the TMSI.

11. The non-transitory computer-readable storage medium according to claim 10, the operations to further configure the one or more processors to, when the signaling permission indicator of the periodic registration update message grants permission to the PS node for the re-establishment of the signaling session between the PS node and the CS node and when the registration confirmation message includes a failure indication for the re-establishment of the signaling session between the PS node and the CS node, encode, for transmission to the PS node, a non-periodic registration update message for registration with the PS node and the CS node and for a re-establishment, by the PS node, of the signaling session between the PS node and the CS node for the UE.

12. The non-transitory computer-readable storage medium according to claim 10, the operations to further configure the one or more processors to, when the signaling permission indicator of the periodic registration update message grants permission to the PS node for the re-establishment of the signaling session between the PS node and the CS node,
encode, for transmission to the PS node, a non-periodic registration update message for registration with the PS node and the CS node and for a re-establishment, by the PS node, of the signaling session between the PS node and the CS node for the UE;
wherein the transmission is in response to a failure to receive the registration confirmation message.

13. The non-transitory computer-readable storage medium according to claim 10, wherein:
the mobile network is a 3GPP network;
the PS node is a Mobility Management Entity (MME) or a Serving GPRS Support Node (SGSN); and
the CS node is a Mobile Switching Center/Visitor Location Register (MSC/VLR).

14. A method of operation in a mobile network that supports packet-switched (PS) and circuit-switched (CS) communication, comprising:
encoding, for transmission to a PS node of the mobile network, a registration message for registration with the PS node and a CS node of the mobile network and for an establishment of a signaling session between the PS node and the CS node for the UE;
encoding, for transmission to the PS node, a periodic registration update message for remaining registered with the PS node in response to a change in a state of the CS node, wherein the periodic registration update message further includes a signaling permission indicator to grant permission for a re-establishment, by the PS node, of the signaling session between the PS node and the CS node for the UE;
receiving, from the PS node, a registration confirmation message for the periodic registration update message that includes a registration acceptance indicator for the PS node; and
encoding for transmission to the PS node, when the registration confirmation message includes a temporary mobile subscriber identity (TMSI) for the registration of the UE with the CS node, a TMSI confirmation message that indicates reception of the TMSI.

15. The method according to claim 14, wherein:
the mobile network is a 3GPP network;
the PS node is a Mobility Management Entity (MME) or a Serving GPRS Support Node (SGSN); and
the CS node is a Mobile Switching Center/Visitor Location Register (MSC/VLR).

16. A packet-switched (PS) node to operate in a mobile network that supports packet-switched (PS) and circuit-switched (CS) communication, the PS node comprising transceiver circuitry; and hardware processing circuitry, the hardware processing circuitry configured to:
decode, from signaling received from a User Equipment (UE), a registration message for registration with the PS node and a CS node of the mobile network and for an establishment of a signaling session between the PS node and the CS node for the UE;
register the UE with the PS node and the CS node;
establish the signaling session between the PS node and the CS node; and
decode, from signaling received from the UE, a periodic registration update message for remaining registered with the PS node in response to a change in a state of the CS node that includes a signaling permission indicator to grant permission for a re-establishment, by the PS node, of the signaling session between the PS node and the CS node for the UE;
encode for transmission to the UE, a registration confirmation message for the periodic registration update message that includes a registration acceptance indicator for the PS node; and
decode, from signaling received from the UE, when the registration confirmation message includes a temporary mobile subscriber identity (TMSI) for the registration of the UE with the CS node, a TMSI confirmation message that indicates reception of the TMSI.

17. The PS node according to claim 16, the hardware processing circuitry further to re-establish the signaling session between the PS node and the CS node for the UE in response to a determination of an error condition for the signaling session at the CS node and further in response to the reception of the periodic registration update message from the UE.

18. The PS node according to claim 16, the hardware processing circuitry further to refrain from re-establishing the signaling session between the PS node and the CS node for the UE when the signaling permission indicator declines permission to the PS node for the re-establishment of the signaling session.

19. The PS node according to claim 16, wherein:
the mobile network is a 3GPP network;
the PS node is a Mobility Management Entity (MME) or a Serving GPRS Support Node (SGSN); and
the CS node is a Mobile Switching Center/Visitor Location Register (MSC/VLR).

* * * * *

UNITED STATES PATENT AND TRADEMARK OFFICE
CERTIFICATE OF CORRECTION

PATENT NO.       : 10,009,911 B2
APPLICATION NO.  : 14/916843
DATED            : June 26, 2018
INVENTOR(S)      : Robert Zaus Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor On page 3, in Column 2, under "Other Publications", Line 31, delete "Physicalchannels" and insert --Physical channels-- therefor On page 5, in Column 1, under "Other Publications", Line 45, delete "informa"," and insert --information",-- therefor In the Claims In Column 15, Line 39, in Claim 8, delete "(MSCNLR)." and insert --(MSC/VLR).-- therefor Signed and Sealed this
Twenty-eighth Day of May, 2019

Andrei Iancu
*Director of the United States Patent and Trademark Office*